United States Patent [19]
Gai et al.

[11] Patent Number: 6,032,194
[45] Date of Patent: Feb. 29, 2000

[54] METHOD AND APPARATUS FOR RAPIDLY RECONFIGURING COMPUTER NETWORKS

[75] Inventors: Silvano Gai, Vigliano d'Asti, Italy; Keith McCloghrie, San Jose; Dinesh G. Dutt, Santa Clara, both of Calif.

[73] Assignee: Cisco Technology, Inc., San Jose, Calif.

[21] Appl. No.: 08/998,412

[22] Filed: Dec. 24, 1997

[51] Int. Cl.$^7$ .............................. G06F 15/18; G06F 13/00
[52] U.S. Cl. .......................... 709/239; 709/221; 709/224; 709/239; 709/238; 370/216; 370/351; 370/217; 370/252; 379/221; 379/273; 714/39; 714/47; 340/825.08; 340/825.03
[58] Field of Search ................................... 709/224, 239, 709/221; 713/100; 340/825; 370/216, 351, 252, 400, 408, 402, 256; 379/221, 273; 714/39, 47

[56] References Cited

U.S. PATENT DOCUMENTS

| | | | |
|---|---|---|---|
| 4,922,486 | 5/1990 | Lidinsky et al. | 370/60 |
| 5,018,137 | 5/1991 | Backes et al. | 370/85.13 |
| 5,138,615 | 8/1992 | Lamport et al. | 370/400 |
| 5,150,360 | 9/1992 | Perlman et al. | 370/94.3 |
| 5,280,480 | 1/1994 | Pitt et al. | 370/85.13 |
| 5,740,171 | 4/1998 | Mazzola et al. | 370/392 |
| 5,742,604 | 4/1998 | Edsall et al. | 370/401 |
| 5,764,636 | 6/1998 | Edsall | 370/401 |
| 5,790,808 | 8/1998 | Seaman | 709/223 |

OTHER PUBLICATIONS

S. Horowitz, "*Dual–Layer Spanning Tree*", (A Spanning Tree Proposal for IEEE 802.1 Q), May 14, 1997.

Lucent Technologies Inc.'s Initial Disclosure of Prior Art Under Civil Local Rule 16–7, Case No. C98–20836 JW (PVT) ENE.

M. Seaman and D. Delaney, *Single or Multiple Filtering Databases*(May 8, 1997).

IEEE Standard 802.1D, "*Draft Standard for Local Area Networks MAC (Media Access Control) Bridges: Technical and Editorial Corrections*", Mar. 6, 1997 (pp. 3–10, 85–122 and 151–158).

Radia Perlman, "*Interconnections: Bridges and Routers*", copyright 1992 (pp. 54–64).

Extending the IEEE 802.1 MAC Bridge Standard to Remote Bridges, Hart, John, Jan. 1988.

Fault–Tolerant Convergence Routing, Yener, B. Bhandari, I., Orek, Y., Yung, M. Apr. 1994.

*Primary Examiner*—Frank J. Asta
*Assistant Examiner*—Beatriz Prieto
*Attorney, Agent, or Firm*—Cesari and McKenna, LLP

[57] ABSTRACT

A method that rapidly reconfigures a computer network having a plurality of devices executing the spanning tree algorithm. First, one or more devices are configured and arranged so that one port, providing connectivity to the root, is in the forwarding state and the remaining ports, providing connectivity to the root, are in the blocked state. Next, one or more of the blocked ports are designated as back-up ports. Upon detection of a failure at the active forwarding port, one of the back-up ports immediately transitions from blocked to forwarding, thereby becoming the new active port for the device. Following the transition to a new active port, dummy multicast messages are transmitted, each containing the source address of an entity directly coupled to the affected device or downstream thereof. By examining the dummy multicast messages, other devices in the network learn to use to the new forwarding port of the affected device. Rapid reconfiguration of the network is also provided upon detection of a new or repaired link or device representing a better path toward the root. The method is also compatible with networks supporting virtual local area network (VLAN) designations and allows load balancing among different VLANs.

16 Claims, 8 Drawing Sheets

METHOD AND APPARATUS FOR RAPIDLY RECONFIGURING COMPUTER NETWORKS

CROSS-REFERENCE TO RELATED APPLICATIONS

This application is related to the following copending U.S. Patent Application: U.S. patent application Ser. No. 08/997,297 entitled, SHARED SPANNING TREE PROTOCOL, filed Dec. 23, 1997, assigned to the assignee of the present application.

FIELD OF THE INVENTION

The present invention relates generally to computer networks, and more specifically, to a method and apparatus for rapidly reconfiguring a computer network following a network change.

BACKGROUND OF THE INVENTION

A computer network typically comprises a plurality of interconnected entities. An entity may consist of any device, such as a computer or end station, that "sources" (i.e., transmits) or "sinks" (i.e., receives) data frames. A common type of computer network is a local area network ("LAN") which typically refers to a privately owned network within a single building or campus. LANs typically employ a data communication protocol (LAN standard), such as Ethernet, FDDI or token ring, that defines the functions performed by data link and physical layers of a communications architecture (i.e., a protocol stack). In many instances, several LANs may be interconnected by point-to-point links, microwave transceivers, satellite hook-ups, etc. to form a wide area network ("WAN") or internet that may span an entire country or continent.

One or more intermediate devices are often used to couple LANs together and allow the corresponding entities to exchange information. For example, a switch may be utilized to provide a "switching" function for transferring information, such as data frames, among entities of a computer network. Typically, the switch is a computer and includes a plurality of ports that couple the switch to the other entities. Ports used to couple switches to each other are generally referred to as a trunk ports, whereas ports used to couple a switch to LANs or end stations are generally referred to as local ports. The switching function includes receiving data at a source port from an entity and transferring that data to at least one destination port for receipt by another entity.

Switches typically learn which destination port to use in order to reach a particular entity by noting on which source port the last message originating from that entity was received. This information is then stored by each switch in a block of memory referred to as a filtering database. Thereafter, when a message addressed to a given entity is received on a source port, the switch looks up the entity in its filtering database and identifies the appropriate destination port to utilize in order to reach that entity. If no destination port is identified in the filtering database, the switch floods the message out all ports, except the port on which the message was received. Messages addressed to broadcast or multicast addresses are also flooded.

To prevent the information in the filtering database from becoming stale, each entry is "aged out" by a corresponding timer. Specifically, when an entry is first added to the filtering database, the respective timer is activated. Thereafter, each time the switch receives a subsequent message from this entity on the same source port, it simply resets the timer. Pursuant to standards set forth by the Institute of Electrical and Electronics Engineers (IEEE), the default value of the timer is five minutes. See IEEE Standard 802.1D. Thus, provided the switch receives a message from a particular entity at least every five minutes, the timer will keep being reset and the corresponding entry will not be discarded. If the switch stops receiving messages, the timer will expire and the corresponding entry will be discarded. Once the entry ages out, any messages subsequently received for this entity must be flooded, until the switch receives another message from the entity and thereby learns the correct destination port.

Additionally, most computer networks include redundant communications paths so that a failure of any given link does not isolate any portion of the network. Such networks are typically referred to as meshed or partially meshed networks. The existence of redundant links, however, may cause the formation of circuitous paths or "loops" within the network. Loops are highly undesirable because data frames may traverse the loops indefinitely. Furthermore, as described above, many devices such as switches or bridges replicate (i.e., flood) frames whose destination port is not known or which are directed to broadcast or multicast addresses, resulting in a proliferation of data frames along loops. The resulting traffic effectively overwhelms the network.

Spanning Tree Algorithm

To avoid the formation of loops, devices, such as switches or bridges, execute a spanning tree algorithm. This algorithm effectively "severs" the redundant links within the network. Specifically, switches exchange special messages called bridge protocol data unit (BPDU) frames that allow them to calculate a spanning tree or active topology, which is a subset of the network that is loop-free (i.e., a tree) and yet connects every pair of LANs within the network (i.e., the tree is spanning). Using information contained in the BPDU frames, the switches calculate the tree in accordance with the algorithm and typically elect to sever or block all of the redundant links, leaving a single communications path.

In particular, execution of the spanning tree algorithm causes the switches to elect a single switch, among all the switches within each network, to be the "root" switch. Each switch has a unique numerical identifier (switch ID) and the root is the switch having the lowest switch ID numeric value. In addition, for each LAN coupled to more than one switch, a single "designated switch" is elected that will forward frames from the LAN toward the root. The designated switch is typically the one closest to the root. By establishing designated switches, connectivity to all LANs, where physically possible, is assured.

Each switch within the network also selects one port, known as its "root port" which gives the lowest cost path (e.g., the fewest number of hops, assuming all links have the same cost) from the switch to the root. The root ports and designated switch ports are selected for inclusion in the spanning tree and are placed in a forwarding state so that data frames may be forwarded to and from these ports and thus onto the corresponding paths or links. Ports not included within the spanning tree are placed in a blocked state. When a port is in the blocked state, data frames will not be forwarded to or received from the port. At the root, all ports are designated ports and are therefore placed in the forwarding state, except for some self-looping ports, if any. A self-looping port is a port coupled to another port at the same switch.

Each BPDU typically includes, in part, the following information: the identifier of the switch assumed to be the root (by the switch transmitting the BPDU), the root path cost to the assumed root and the identifier of the switch transmitting the BPDU. Upon receipt of a BPDU, its contents are examined and compared with similar information (i.e., assumed root ID, lowest root path cost and switch ID) stored by the receiving switch. If the information from the received BPDU is "better" than the stored information, the switch adopts the better information and begins transmitting it (adding the cost associated with the receiving port to the root path cost) through its ports, except for the port on which the "better" information was received. Eventually, all switches will agree on the root and each will be able to identify which of its ports presents the lowest cost path to the root (i.e., its root port).

Depending on the configuration of a given network, the location of the root can significantly affect the distance that messages must travel. For example, many networks include a plurality of switches designated as access switches that provide connectivity to LANs, end stations, etc., and a plurality of backbone switches that, in turn, interconnect the various access switches. If the root is located at an access switch and the principal server utilized by the end stations (i.e., clients) is coupled to a backbone switch, the average distance between end stations and the primary server may be quite high, resulting in inefficient network operation. In addition, the backbone switches may become partitioned as ports between them are blocked. To reduce the average distance and avoid partitioning of the backbone switches, it is desirable to locate the root at a backbone switch. Switch IDs, moreover, include a fixed portion and a settable portion. By substantially decreasing the value of the settable portion of the identifier for a selected switch, a network administrator may "force" the network to choose the selected switch as the root.

To identify which switch should be the designated switch, switches again compare information in received BPDUs with their stored information. If the root path cost stored by a first switch is lower than the root path cost contained in BPDUs received from a second switch, then the first switch is the designated switch. If the root path cost for both the first and second switches is the same, the first switch compares the next informational element in the BPDU, i.e., the switch IDs. If the switch ID of the first switch is less than the ID of the second switch, then the first switch is the designated switch, otherwise the second switch is the designated switch.

In accordance with the spanning tree algorithm, the root switch generates and transmits BPDUs from its ports every hello time which is a settable parameter. Pursuant to IEEE standards, the default hello time is two seconds. In response to receiving BPDUs, switches transmit their own BPDUs. Thus every two seconds BPDUs are propagated through the network. BPDU information, moreover, like entity address information, is subject to being aged out and discarded. Typically, a timer is associated with the BPDU information stored for each port of a switch. The timer is set to a value referred to as the maximum age which is loaded into BPDUs generated by the root switch and copied by the other switches. An example of a default maximum age value is twenty seconds. As BPDUs are received, their contents are examined. If the contents match the information already stored for that port, the timer is reset. Accordingly, by receiving consistent BPDUs every hello time, which is significantly less than the maximum age, the current BPDU information is maintained and the accuracy of the spanning tree or active topology is confirmed.

If a switch stops receiving BPDUs on its root port, indicating a possible link or device failure, the corresponding timer will expire and the information will be discarded. In response, the switch will select a new root port based upon the next best information it has, and begin transmitting BPDUs through its other ports. Similarly, as links or devices are repaired or added, a switch may receive BPDUs containing better information than that stored for a particular port, thereby causing the switch to replace the previously stored information, as described above.

As BPDU information is up-dated and/or timed-out, the spanning tree is recalculated and ports may transition from the blocked state to the forwarding state and vice versa. That is, as a result of new BPDU information, a previously blocked port may learn that it is now the root port or the designated port for a given LAN. Rather than transition directly from the blocked state to the forwarding state, ports transition through two intermediate states: a listening state and a learning state. In the listening state, a port waits for information indicating that it should return to the blocked state. If, by the end of a preset time, no such information is received, the port transitions to the learning state. In the learning state, a port still blocks the receiving and forwarding of frames, but received frames are examined and the corresponding location information is stored, as described above. At the end of a second preset time, the port transitions from the learning state to the forwarding state, thereby allowing frames to be forwarded and received at the port. The time spent in each of the listening and the learning states is referred to as the forwarding delay.

As ports transition between the blocked and forwarding states, entities may appear to move from one port to another. To prevent switches from distributing messages based upon incorrect information, switches quickly age-out and discard the "old" information in their filtering databases. More specifically, upon detection of a change in the spanning tree, switches transmit Topology Change Notification Protocol Data Unit (TCN-PDU) frames toward the root. The format of the TCN-PDU frame is well known (see IEEE 802. 1D standard) and, thus, will not be described herein. The TCN-PDU is propagated hop-by-hop until it reaches the root which confirms receipt of the TCN-PDU by setting a topology change flag in all BPDUs subsequently transmitted by the root for a period of time. Other switches, receiving these BPDUs, note that the topology change flag has been set, thereby alerting them to the change in the active topology. In response, switches significantly lower the aging time associated with their filtering databases which, as described above, contain destination information corresponding to the entities within the network. Specifically, switches replace the default aging time of five minutes with the forwarding delay time, which is generally fifteen seconds according to the IEEE standards. Information contained in the filtering databases is thus quickly discarded.

Although the spanning tree algorithm is able to maintain a loop-free tree despite network changes, recalculation of the spanning tree is a time consuming process. For example, as described above, the maximum age of BPDUs (i.e., the length of time that BPDU information is kept) is typically twenty seconds and the forwarding delay time (i.e., the length of time that ports are to remain in each of the listening and learning states) is fifteen seconds. As a result, recalculation of the spanning tree following a network change takes approximately fifty seconds (e.g., twenty seconds for BPDU information to time out, fifteen seconds in the listening state and another fifteen seconds in the learning state).

During this recalculation period, message delivery is often delayed as ports transition between states. That is, ports in the listening and learning states do not forward or receive messages. To the network users, these delays are perceived as service interruptions, which may present significant problems, especially on high-reliable networks. In addition, certain applications, protocols or processes may time-out and shut down during the reconfiguration process, resulting in even greater disruption to the system. Another disadvantage relates to subsequent message distribution. Following the reconfiguration process, messages are flooded across the network until the "new" destination ports are learned and the aging time returned to five minutes. Such flooding of messages often consumes substantial communications and processor resources.

SUMMARY OF THE INVENTION

It is an object of the present invention to provide a method and apparatus for reducing the time necessary to reconfigure the network following a change, such as a link failure or recovery.

It is a further object of the present invention to provide a method and apparatus for defining a series of back-up ports which may immediately begin forwarding data messages following a failure at an active port.

It is another object of the present invention to provide a method and apparatus for defining primary and back-up root devices such that the back-up becomes the new root upon failure of the primary.

Another object of the present invention is to provide a method and apparatus for balancing message traffic across several links of a computer network.

Yet another object of the present invention is to provide a method and apparatus that is compatible with non-enabled devices.

Briefly, the invention relates to a method and apparatus for rapidly reconfiguring a computer network. The network preferably includes a plurality of devices executing the spanning tree algorithm so as to elect a root and place the ports of the devices in either a forwarding or blocked state. In accordance with the method, one or more devices are configured and arranged so that one trunk port is in the forwarding state and other trunk ports are in the blocked state. Additionally, one or more of the blocked ports are designated as back-up ports. Upon detection of a failure at the active forwarding port, the state of one of the back-up ports immediately transitions from blocked to forwarding, thereby becoming the new active port for the device. Advantageously, the selected back-up port does not transition through any intermediary states (such as the listening or learning states) in moving from blocked to forwarding. Accordingly, the time required to transition to a new active port capable of forwarding data messages is substantially reduced.

Upon transition to the new forwarding port, the device begins transmitting "dummy" multicast messages through the new port. These dummy multicast messages carry the source address of each entity that is directly coupled to the device with the new active port or downstream thereof (relative to the root) and are received by other devices in the computer network. Upon receipt, the other devices examine the contents of these messages and note the port on which they were received, which may differ from the port on which messages from these entities were previously received (i.e., before the failure and subsequent replacement of the device's active port). It is through this process that other devices within the network learn to utilize the new forwarding port, rather than the failed port, when directing messages to these entities. Notably, the transition to a new forwarding port is accomplished without other devices having to discard the contents of their filtering databases and, thus, the flooding of messages following a network change is substantially reduced.

In the illustrated embodiment, the method and apparatus manifests, in part, as a series of novel commands that may be entered at the devices. The devices, moreover, may be classified as either access switches or backbone switches. Access switches are preferably coupled to entities (e.g., LANs, end stations, etc.) whereas backbone switches provide the interconnections between access switches. A first command, Become_Root_Primary, is preferably entered at a first backbone switch and significantly lowers the value of the first backbone switch's numeric ID, thereby forcing it to become the root upon execution of the spanning tree algorithm. This command also modifies certain parameters associated with the spanning tree algorithm to further reduce reconfiguration time. A second command, Become_Root_Secondary, preferably entered at a second backbone switch, adjusts the second backbone switch's ID to a value between a default value and the value specified in the Become_Root_Primary command. The Become_Root_Secondary command thus causes the second backbone switch to become the new root upon a failure of the first backbone switch.

A third command, Enable_Uplinkfast, is preferably entered at each access switch. This command substantially increases the values of access switches' IDs, effectively precluding any access switch from becoming the root. This command also increases the path costs associated with each port of the access switches. By raising the path costs, access switches are less likely to become designated switches. As a result, only one trunk port (i.e., the root port) for each access switch is generally placed in the forwarding state. The remaining trunk ports which normally connect the access switch to the corresponding backbone switches are blocked.

The Enable_Uplinkfast command also designates the blocked trunk ports of the corresponding access switch, except self-looping ports, as possible back-up root ports. Upon failure of the current root port, this command additionally configures the access switch to immediately transition one of its blocked trunk ports to the forwarding state and to also begin transmitting dummy multicast messages through the new port, as mentioned above. Upon detection of a new or repaired link or device representing a better path toward the root, this command additionally configures the access switch to transition to the new path without suffering a loss of connectivity. Reconfiguration of the network may thus be accomplished substantially sooner than the time required by the conventional spanning tree algorithm while still avoiding the formation of loops.

BRIEF DESCRIPTION OF THE DRAWINGS

The above and further advantages of the invention may be better understood by referring to the following description in conjunction with the accompanying drawings, in which.

DETAILED DESCRIPTION OF THE PREFERRED EMBODIMENT

Figure 1:
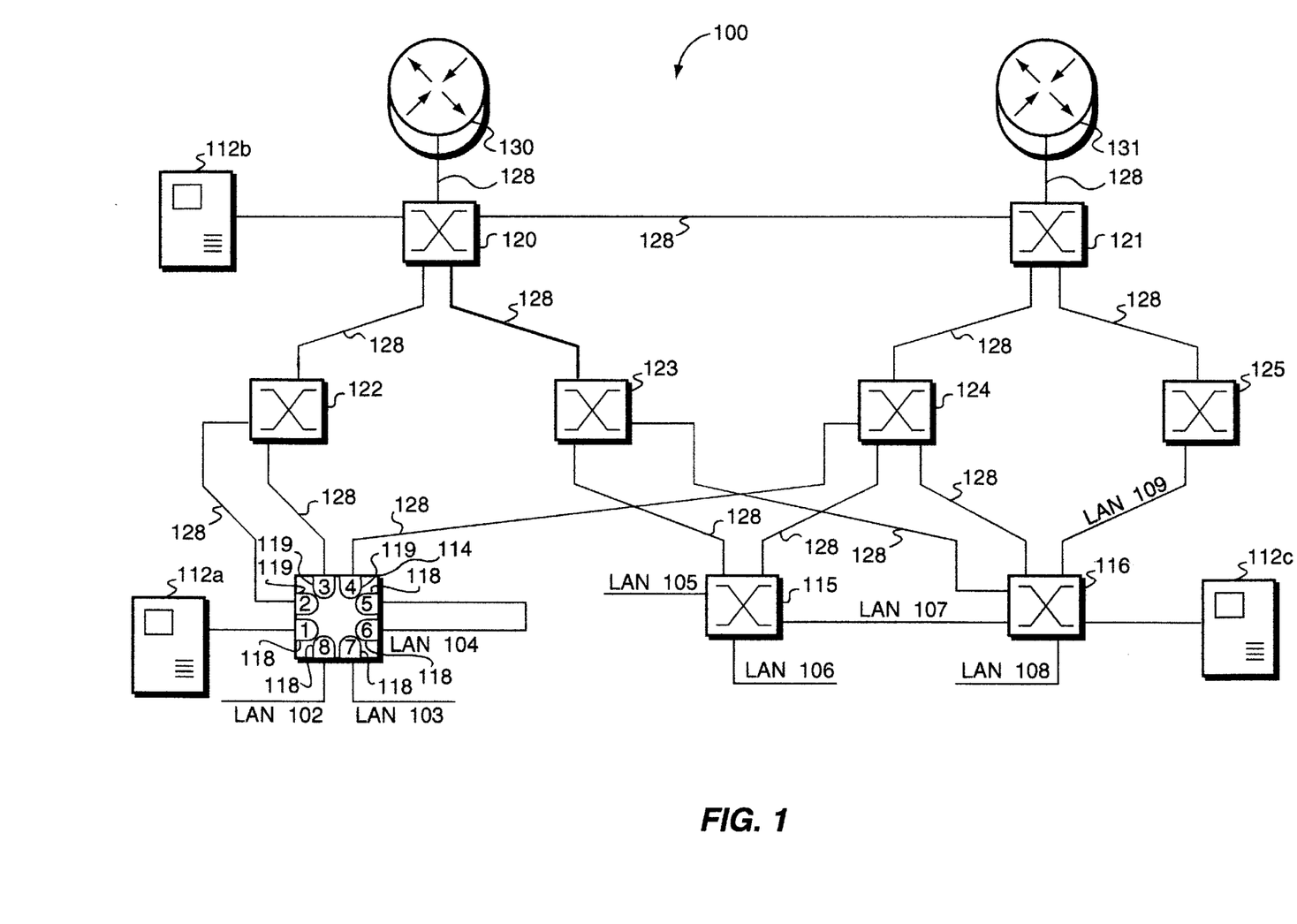
FIG. 1 is a highly schematic diagram of a computer network in accordance with the present invention.

FIG. 1 illustrates a partially meshed computer network 100 in accordance with the present invention. The network 100 preferably comprises a plurality of local area networks (LANs) 102–109 each of which is coupled to one or more access switches 114–116. Access switches 114–116 are interconnected with each other through a plurality of backbone switches 120–125. Specifically, access switches 114–116 are generally connected to the backbone switches 120–125 through a series of links 128, such as point-to-point links, although they may be connected via a shared media (e.g., LAN 109). The backbone switches 120–125 are similarly interconnected by links 128. Each access switch 114–116 and backbone switch 120–125, moreover, includes a plurality of ports which, if coupled to a LAN 102–109, are referred to as local ports 118 and if coupled to links 128 are referred to as trunk ports 119.

Network 100 further includes a plurality of servers 112a–112c, such as file servers, print servers, etc., each coupled to the local port 118 of one or more access or backbone switches. Each LAN 102–109 includes one or more hosts or end stations (not shown) that may source or sink data frames to one another or to the servers 112a–112c over the network 100. One or more routers 130 and 131 may also be provided to add functionality to network 100. Preferably, each router 130, 131 is coupled to a backbone switch, such as backbone switches 120 and 121, by a corresponding link 128.

Links 128 represent communications paths between various components of the network 100, that carry messages, such as data frames, between switches 114–116, 120–125 and routers 130, 131. In addition, each switch and router, such as access switch 114, identifies its local and trunk ports 118 and 119 by numbers (e.g., port number one, port number two, port number three, etc.) Switches 114–116, 120–125 and routers 130, 131 are thus able to associate specific ports with the LANs, switches, routers, servers, etc. that are coupled thereto or otherwise accessible through a given port.

It should be understood that the network 100 of FIG. 1 is meant for illustrative purposes only and that the present invention will operate with other network designs having possibly far more complex topologies. For example, one or more distribution switches may be interleaved between the backbone switches and the access switches, two access switches may be directly connected, etc. It will also be understood to those skilled in the art that there is no distinction from the spanning tree point of view between local and trunk ports or point-to-point links and shared links (e.g., LANs). The distinction between local and trunk ports is made for purposes of explanation only.

As shown, network 100 includes redundant communication paths interconnecting the access and backbone switches 114–116 and 120–125. The existence of such redundant links prevents portions of the network 100 from becoming isolated should any constituent link or device fail. Such redundancy, however, also results in the creation of loops, which, as described above, are highly undesirable. To avoid the creation of loops, these switches execute the spanning tree algorithm, as described herein.

Figure 2:
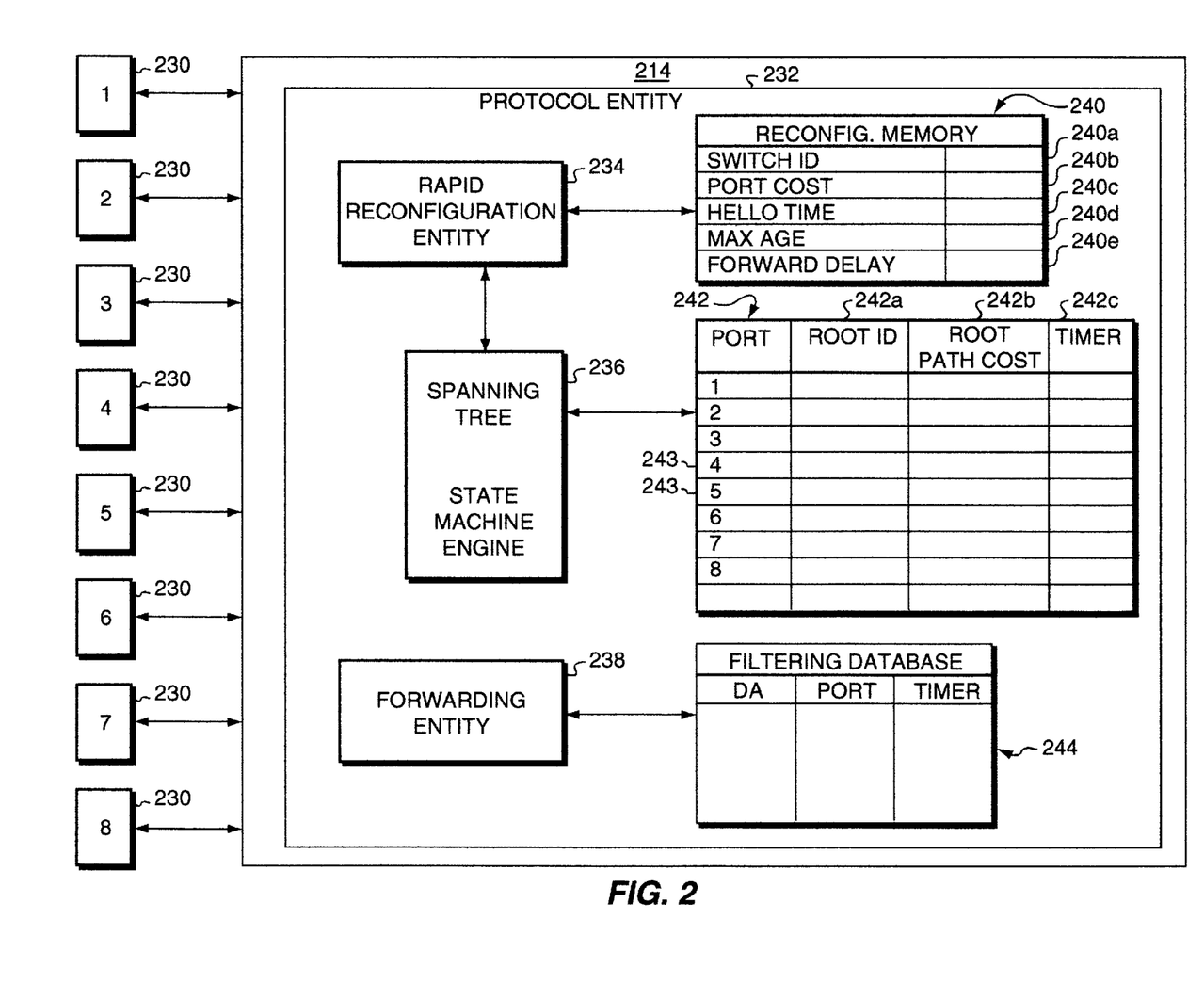
FIG. 2 is a partial block diagram of a device in accordance with a preferred embodiment of the present invention.

FIG. 2 is a partial block diagram of a switch 214 in accordance with the present invention which corresponds to access switch 114 of FIG. 1. A switch suitable for use with the present invention is described in commonly owned U.S. patent application Ser. No. 08/623,142 filed Mar. 28, 1996 and entitled INTERSWITCH LINK MECHANISM FOR CONNECTING HIGH-PERFORMANCE NETWORK SWITCHES which is hereby incorporated by reference in its entirety. Switch 214 includes a plurality of ports 230 each of which is preferably identified by a number (e.g., port numbers one through eight). Frame transmission and reception objects (not shown) may be associated with each port 230 such that frames received at a given port 230 may be captured, and frames to be transmitted by switch 214 may be delivered to a given port. Frame reception and transmission objects are preferably message storage structures, such as queues.

Switch 214 further includes a protocol entity 232. The protocol entity 232 preferably includes a rapid reconfiguration entity 234, at least one spanning tree state machine engine 236 and a forwarding entity 238. The rapid reconfiguration entity 234 is coupled to a reconfiguration memory 240. Memory 240 includes a plurality of cells 240a–240e for storing the unique numeric switch identifier (ID) corresponding to switch 214, the assigned path cost corresponding to each port 230 and the values corresponding to the hello time, maximum age and forward delay parameters of the spanning tree algorithm. As set forth above, a switch ID includes a fixed portion and a settable portion.

Each spanning tree engine 236 is similarly coupled to a spanning tree table 242 having a plurality of rows and columns. Each row or entry 243 of table 242 is preferably associated with a port 230 of the switch 214. The columns or cells, moreover, include a root ID cell 242a, a root path cost cell 242b and a corresponding timer cell 242c. It should be understood that table 242 may include additional cells.

The forwarding entity 238 is coupled to a filtering database 244 configured to store address information corresponding to the entities of network 100. Specifically, filtering database 244 has a plurality of columns or cells, including a destination address cell, a destination port cell and a corresponding timer cell. Each row or entry in the filtering database 244 preferably corresponds to a particular entity.

It will be understood to those skilled in the art that memory 240 and tables 242 and 244 may be implemented as content addressable memory (CAM) devices and that entities 234 and 238 and state machine engine 236 may comprise registers and combinational logic configured and arranged to produce sequential logic circuits. In the illustrated embodiment, entities 234 and 238 and state machine engine 236 preferably comprise programmable processing elements containing software programs pertaining to the methods described herein and executable by the processing elements. Other computer readable media may also be used to store and execute the program instructions.

The method and apparatus of the present invention is preferably implemented, in part, through the operation of a plurality of novel commands entered at the various switches of the network 100 (FIG. 1), typically by a user or network administrator.

Figure 3A:
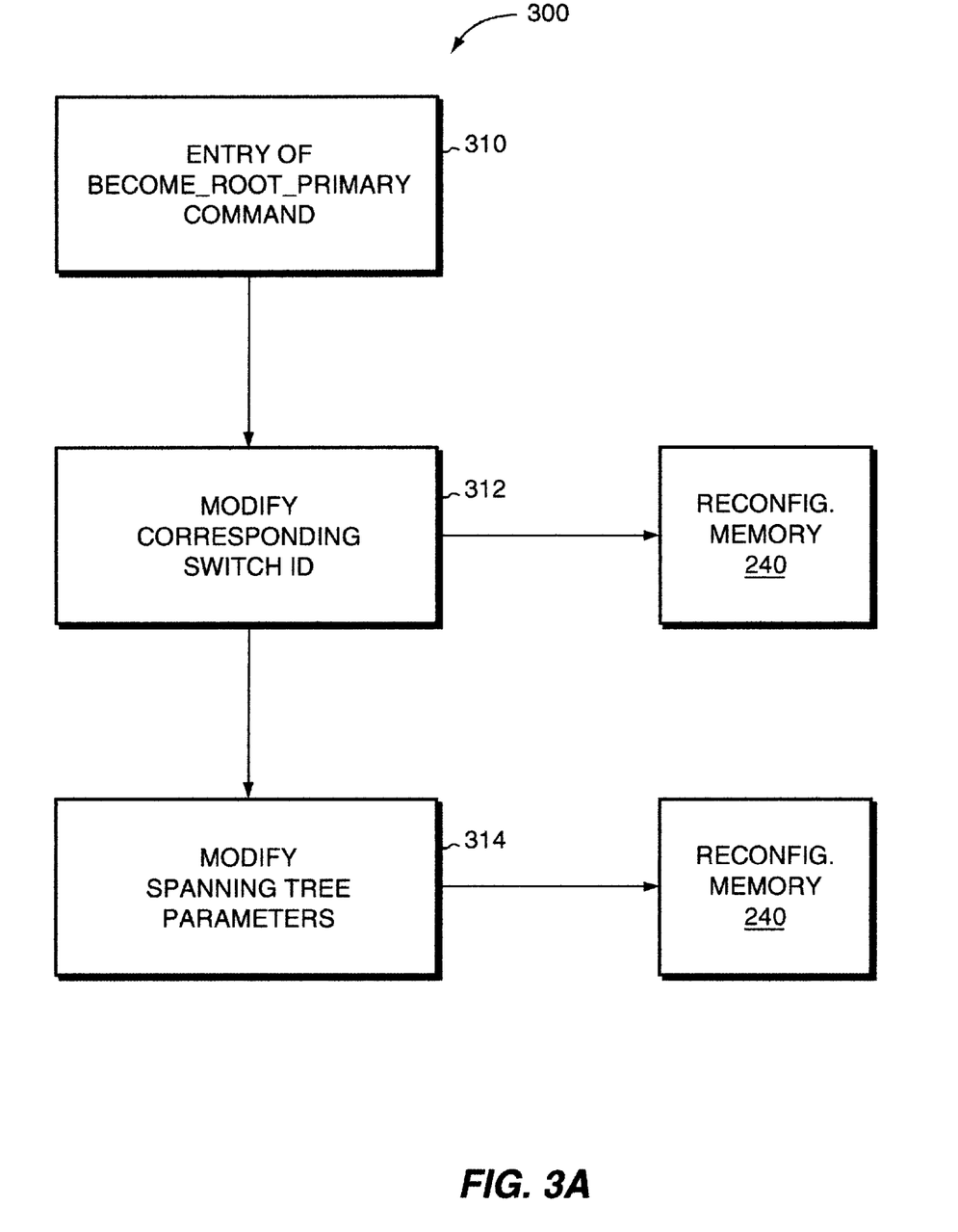
FIGS. 3A–E are flow diagrams of methods used to rapidly reconfigure the computer network.

FIG. 3A is a flow diagram of a Become_Root_Primary command 300 that is preferably entered at a first backbone switch (e.g., backbone switch 120). Selection of the particular backbone switch as the primary root may depend on where the most utilized server, such as server 112b, is located. That is, to reduce the average distance that messages must travel, the Become_Root_Primary command 300 is preferably entered at the backbone switch coupled to the most heavily utilized server, as shown at block 310. In response to the Become_Root_Primary command 300, the rapid reconfiguration entity 234 of the selected backbone switch 120, at block 312, modifies the settable portion of the corresponding switch ID stored at reconfiguration memory 240. In particular, the value of the switch ID is significantly lowered to ensure that the selected backbone switch 120 will be elected the root switch upon execution of the spanning tree algorithm. For example, the switch ID may be reduced from the default value of "32768" specified by the IEEE standards to "8192". In addition, the Become_Root_Primary command, at block 314, also modifies the hello time, maximum age and forward delay parameters of the spanning tree algorithm as a function of network diameter as set forth in Table 1. Network diameter is defined by the IEEE 802.1D standard as the maximum number of devices between any two points of attachment of end stations and is an argument of the Become_Root_Primary command 300.

TABLE 1

| Network Diameter | 2 | 3 | 4 | 5 | 6 | 7 |
|---|---|---|---|---|---|---|
| hello time | 1.0 | 1.0 | 1.0 | 1.0 | 1.0 | 1.0 |
| maximum age | 6.0 | 7.0 | 8.5 | 10.0 | 11.5 | 13.0 |
| forward delay | 4.0 | 4.8 | 5.8 | 6.8 | 7.8 | 8.8 |

These values are then stored at memory 240 by reconfiguration entity 234. To implement the Become_Root_Primary command 300, entity 234 may maintain the information of Table 1 in memory, such as memory 240.

Figure 3B:
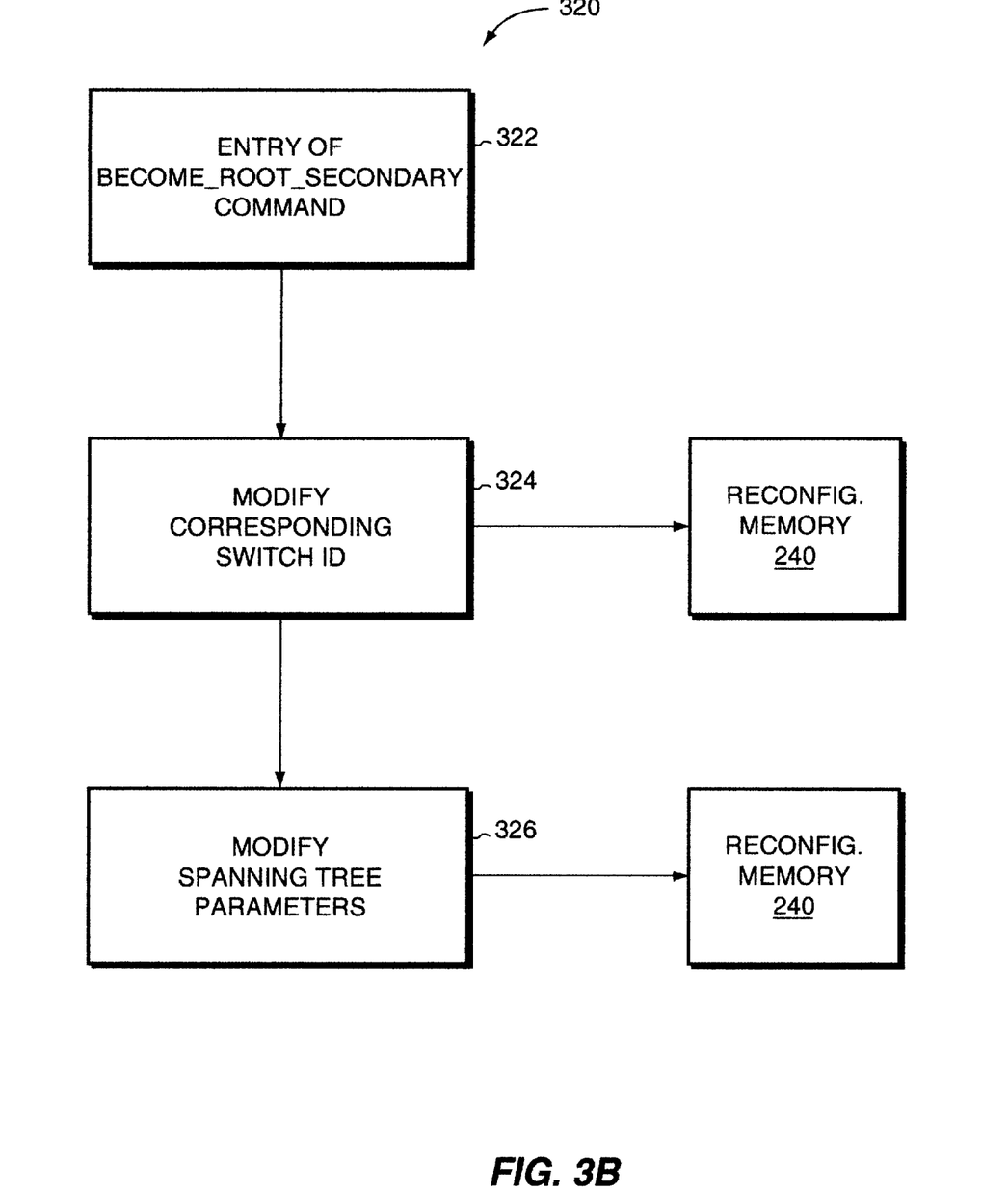

In case the first backbone switch 120 should ever fail, a second command is preferably entered to establish a back-up root. Referring to the flow diagram of FIG. 3B, a Become_Root_Secondary command 320 is preferably entered at a second backbone switch (e.g., backbone switch 121), as shown at block 322. The Become_Root_Secondary command 320 similarly modifies the settable portion of the switch ID of the second backbone switch 121 that is stored at the respective reconfiguration memory 240, as shown by block 324. Specifically, the value of the switch ID is modified so as to be between the default IEEE 802.1D value (i.e., "32768") and the value specified by the Become_Root_Primary command 300 (i.e., "8192"). For example, the switch ID may be set to "16384". The Become_Root_Secondary command 320 also utilizes network diameter as an argument and modifies the hello time, maximum age and forward delay parameters stored at the respective memory 240 of switch 121 in accordance with Table 1, as reflected by block 326.

It should be understood that other similar commands may be entered to designate third and fourth in line root switches.

Figure 3C:
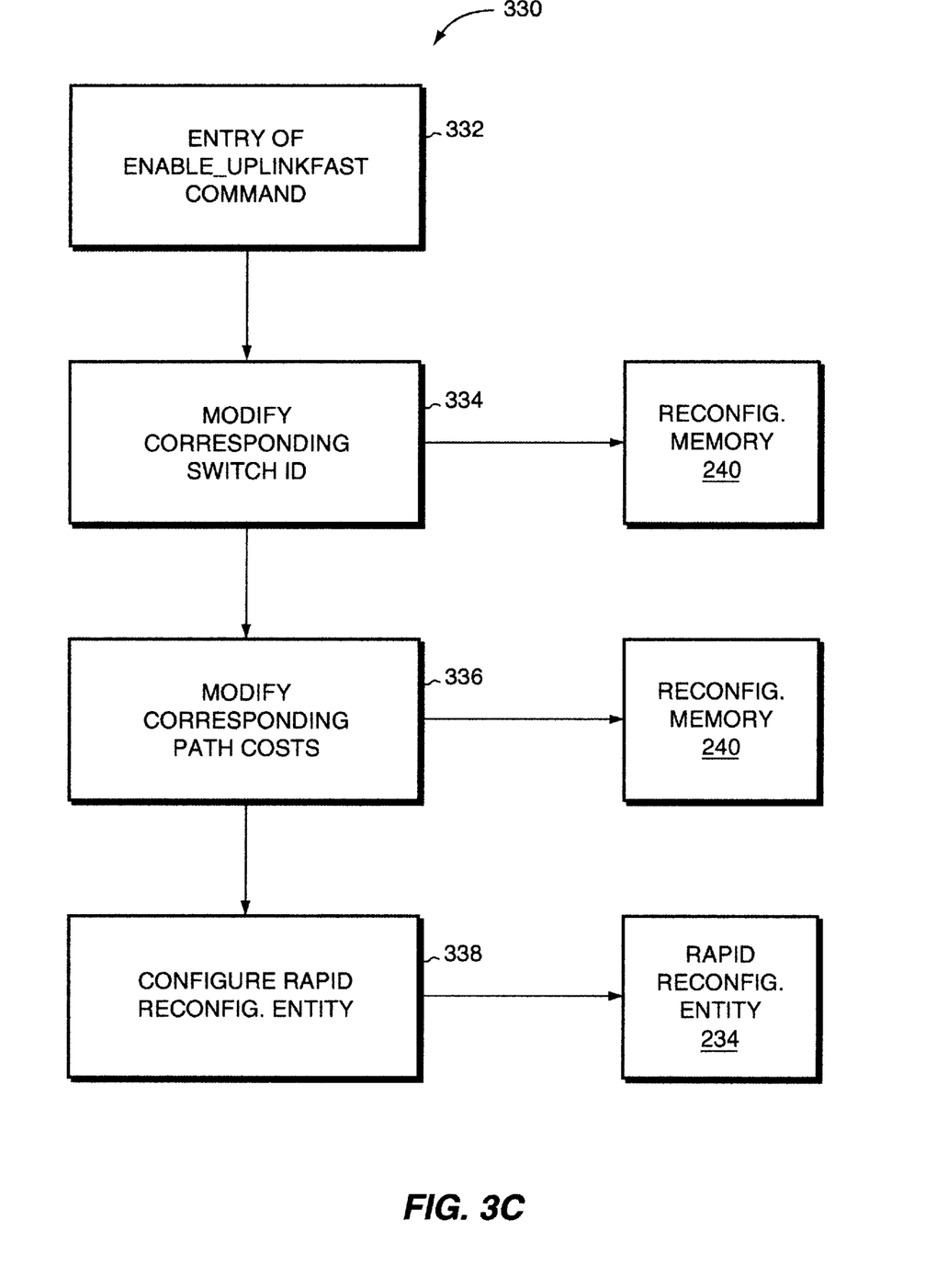

Turning next to FIG. 3C, an Enable_Uplinkfast command 330 is preferably entered at each access switch 114–116 within the network 100, as shown at block 332. This command 330, at block 334, preferably increases the respective switch ID of each of the access switches 114–116 to preclude any of the access switches 114–116 from becoming the root. Specifically, the Enable_Uplinkfast command 330 preferably increases the settable portion of the switch ID stored at respective memory 240 from the IEEE default value of "32768" to "49152". At block 336, the Enable_Uplinkfast command 330 also significantly increases the path costs of all the ports of the respective access switch. For example, the path costs stored at memory 240 for each port are preferably increased from the IEEE default value of "10" (for 100 Mbps ports) to "3000". The Enable_Uplinkfast command 330, at block 338, also configures rapid reconfiguration entity 234 to rapidly transition a blocked port to the forwarding state and to generate and transmit dummy multicast messages, as described below.

Upon start-up, the ports 230 of each switch, such as switch 214, are initially placed in the listening state and spanning tree engine 236 begins formulating and transmitting bridge protocol data unit (BPDU) frames from each port 230. Presumably, switch 214 has yet to receive any BPDUs; switch 214 thus assumes that it is the root and transmits BPDUs from every port 230 containing its switch ID as the root ID and a root path cost of zero. Spanning tree engine 236 obtains the switch ID and a maximum age value for loading in BPDUs from entity 234 and copies the information contained in transmitted BPDUs into its associated spanning tree table 242.

As BPDUs are received at the ports 230 of switch 214, they are passed to the spanning tree engine 236 and processed. Specifically, engine 236 compares information contained in the received BPDUs with the information stored in table 242. If the information from the received BPDU is better (e.g., a presumed root with a lower ID) than the stored information, engine 236 enters the received information into table 242. Engine 236 also sets the corresponding timer according to the maximum age value in the received BPDU and stops forwarding BPDUs through this port 230. Execution of the spanning tree algorithm will converge with the election of a single root by all of the switches in the network 100.

As discussed above, location of the root may affect the average distance (i.e., the average number of hops) a message travels and/or cause undesirable partitioning of backbone switches. The conventional spanning tree algorithm, however, simply selects the switch having the lowest ID to become the root, regardless of where in the network 100 this switch is located. As a result, an access switch is often elected to be the root, causing messages to travel a much higher average distance than if a backbone switch had been elected the root for many network configurations, such as partially meshed distributed networks.

Since the numeric switch ID of the first backbone switch 120 is lowered to a value below that of all other switches in the network 100 (through the Become_Root_Primary command 300), first backbone switch 120 is elected the root switch. Thus, all ports of the first backbone switch 120 are placed in the forwarding state. In addition, since the maximum age and forwarding delay parameters are copied by each switch from BPDUs originating from the root through operation of the spanning tree algorithm, the values selected from the Become_Root_Primary command 300 (see Table 1) are effectively propagated to all switches 114–116 and 121–125 within network 100 (FIG. 1).

For all LANs coupled to both an access switch and a backbone switch, operation of the above commands 300, 320, 330 also results in the respective backbone switch becoming the designated switch, rather than the access switch. In particular, by significantly increasing the path costs (e.g., from "10" to "3000") for all ports of the access switches 114–116, the Enable_Uplinkfast command 330 essentially prevents access switches from becoming designated switches on shared media or trunk links when the second switch is a backbone switch. With reference to LAN 109 which is coupled to both access switch 116 and backbone switch 125, for example, only one switch port connected to LAN 109 will be deemed the designated switch port by the spanning tree algorithm. Determination of the designated switch, moreover, depends in part on the path costs at the relevant ports of the two switches coupled to LAN 109. Since the path costs at access switch 116 have been increased to "3000", whereas the path costs at backbone switch 125 remain at the default value of "100" for ports operating at a data rate of 10 Mb/s or "10" for ports operating at 100 Mb/s, the port at backbone switch 125 coupled to LAN 109 will be deemed the designated switch port and placed in the forwarding state. Furthermore, unless the port at access switch 116 coupled to LAN 109 represents the root port for switch 116, it will be placed in the blocked state.

Significantly, for each access switch 114–116, only one port (local or trunk) that represents a path from the access switch to the root (i.e., provides connectivity to the root through links, shared media, switches, etc.) will be forwarding. All other ports (local or trunk) that represent paths from the access switch to the root will be blocked. In other words, only one port at each access switch 114–116 that provides connectivity to the root will be forwarding.

As messages (i.e., data frames) are subsequently received at the ports 230, they are passed to forwarding entity 238, assuming the respective port 230 is in the forwarding state. The forwarding entity 238 first examines the destination address of the message and performs a look up function at the filtering database 244. Assuming an entry is found and a corresponding destination port (e.g., port number four) is identified, the message is switched out onto this port, assuming this port is in the forwarding state. If no entry is found in the filtering database 244, the message is flooded out all ports 230 in the forwarding state, except the port 230 on which the message was received. The forwarding entity 238 next examines the source address of the message and performs another look-up at filtering database 244. If no entry is found for the source address, a new entry is formed and the source port (e.g., port number eight) on which the message was received is entered as the destination port in the corresponding port column. In addition, a timer associated with this entry is set to the aging time with which forwarding entity 238 is configured (e.g., five minutes).

Should a change occur in the network 100, such as a failure disabling the link coupled to a root port of an access switch, the affected access switch will be able to rapidly reconfigure the network 100 without the significant interruption or message flooding experienced through conventional operation of the spanning tree algorithm. With reference to switch 114, for example, assume that port number three, which is coupled to backbone switch 122, is the root port for switch 114 and thus in the forwarding state. Pursuant to the Enable_Uplinkfast command 330, port numbers two and four, which also connect switch 114 to the backbone switches (i.e., backbone switches 122 and 124), are in the blocked state. If the link 128 coupled to the port number three at switch 114 fails, either one of these two other ports (i.e., port numbers two or four) will immediately transition to the forwarding state and begin receiving and sending messages.

First, the time taken to detect such a change is substantially reduced by operation of the novel commands of the present invention. In particular, as shown in FIG. 3A and as provided in Table 1, the Become_Root_Primary command 300 at block 314 causes the maximum age value to be significantly lowered from the default value of twenty seconds. For example, if the network diameter is five, the maximum age is reduced to ten seconds. As described above, this value is loaded into BPDUs originating at the root (i.e., backbone switch 120), causing it to be propagated to and stored by each switch at its respective reconfiguration memory 240. Accordingly, access switches 114–116 and backbone switches 120–125 detect failures much sooner since the corresponding BPDU information times out sooner. To prevent BPDU information from being inadvertently discarded due to the reduction in maximum age values, the hello time is also reduced to one second. This increases the frequency with which the root transmits BPDUs.

Rather than wait for the corresponding BPDU information to time out, a link failure may alternatively be detected by a link integrity test which operates at the physical layer of the protocol stack. The link integrity test typically exchanges test messages across the respective link 128 at a relatively high rate (e.g., every ten milliseconds). Thus, the link integrity test is able to detect a failure much sooner than the spanning tree algorithm, which simply waits for the respective BPDU information to time out and be discarded.

Figure 3D:
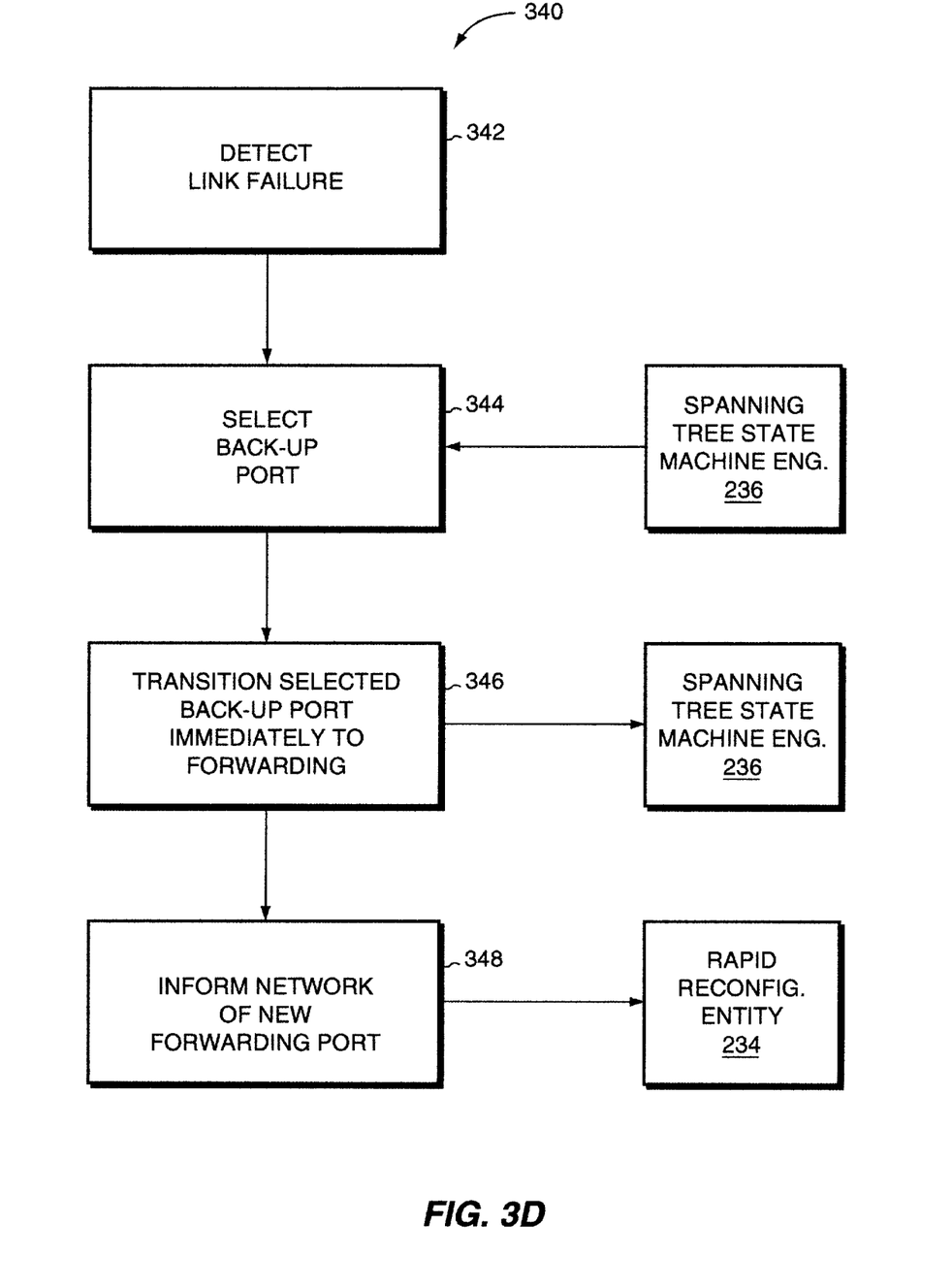

FIG. 3D is a flow diagram of a rapid reconfiguration process 340 following a link failure according to the present invention. In response to the detection of a failure at port number three (the root port), indicated at block 342, rapid reconfiguration entity 234 at switch 214 selects a backup port to become the new root port, as shown at box 344. Rapid reconfiguration entity 234 may use the spanning tree algorithm to select the next root port. That is, the blocked trunk port 119 (e.g., port number four) representing the next lowest root path cost (after the now failed root port) may be selected as the new forwarding port by entity 234. Self-looping ports, such as port numbers five and six at switch 114 are not considered possible back-up ports, even though at least one of these ports will be in the blocked state, since these ports will not provide connectivity to the root.

It should be understood that other methods may be used to select the new root port. For example, the blocked trunk port having the lowest port number (e.g., port number two) may be selected.

Rapid reconfiguration entity 234, at block 346, then directs the spanning tree state machine engine 236 to immediately transition the selected back-up port (e.g., port number four) to the forwarding state. That is, the spanning tree engine 236 does not transition the selected back-up port between the listening or learning states. Instead, the selected back-up port transitions directly to the forwarding state under the direction of rapid reconfiguration entity 234, and switch 114 immediately begins transmitting and receiving messages through this newly activated trunk port 119 (e.g., port number four).

Since none of the other trunk ports 119 which connect switch 114 to the backbone switches (i.e. to the root) are in the forwarding state no circuitous path or loop will result from the transition directly to the forwarding state. That is, by preventing access switches 114–116 from becoming the root and configuring the access switches 114–116 to block all but one of their ports 118, 119 to the backbone switches (i.e., all but one path to the root), through the operation of the above commands, a back-up port may be safely transitioned directly to the forwarding state. Ports 118, 119 that provide connectivity downstream relative to the root (i.e., to the leaves of the spanning tree) need not be blocked, since they cannot cause loops.

Figure 4:
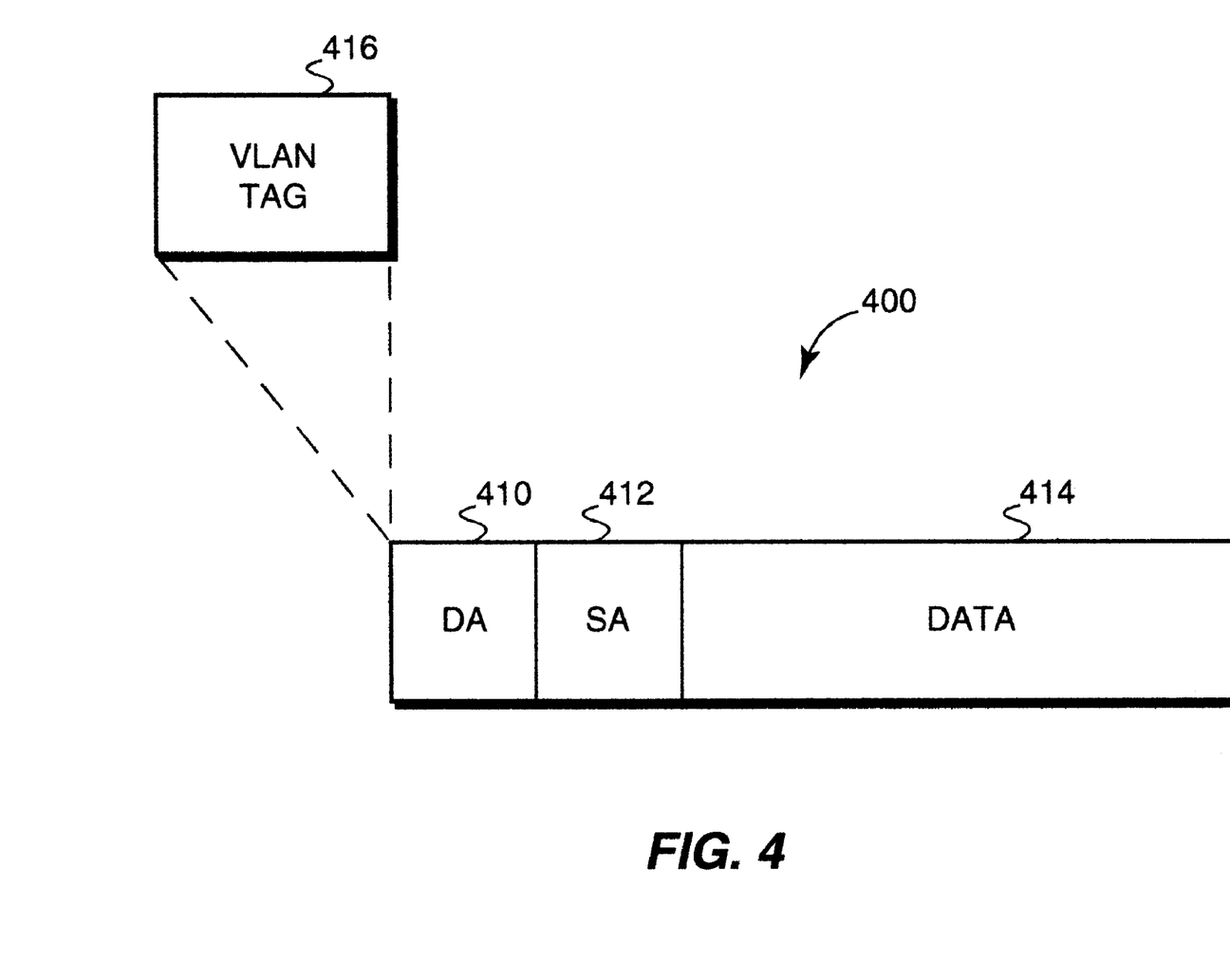
FIG. 4 is a block diagram of a dummy multicast message in accordance with a preferred embodiment of the present invention.

Nonetheless, the transition at access switch 114 from initial root port number three to back-up root port number four may cause entities to appear to "move" relative to other devices. Thus, the identity of the new root port (e.g., port number four) must be propagated to the other devices, such as access switches 115–116 and backbone switches 120–125 to prevent messages from being lost or misdirected. Switch 114, via rapid reconfiguration entity 234, preferably informs the other devices of its new forwarding port by transmitting dummy multicast packets through the new port, as indicated at block 348. FIG. 4 is a highly schematic illustration of a dummy multicast message 400 preferably utilized by rapid reconfiguration entity 234. Dummy multicast message 400 includes a destination address (DA) field 410 and a source address (SA) field 412 that may be compatible with the Media Access Control (MAC) layer of the protocol stack. In the preferred embodiment, dummy multicast message 400 complies with the IEEE 802.3 standard and includes conventional logical link control (LLC) and SubNetwork Access Protocol (SNAP) encapsulation, which are well known to those skilled in the art. Rapid reconfiguration entity 234 preferably loads DA field 410 with a multicast address that causes message 400 to be received by all devices (e.g., access switches 114–116 and backbone switches 120–125) within the network 100.

Next, rapid reconfiguration entity 234 (FIG. 2) loads SA field 412 with the address of an entity directly coupled to switch 114. For example, in a first multicast message 400, entity 234 loads the address of server 112a into the source address field 412. Although multicast message 400 may further include a data field 414, its contents are preferably not asserted by entity 234. Multicast message 400, having the address of server 112a loaded in SA field 412, is then forwarded through the new root port (i.e., port number four) of switch 114. Multicast message 400 is first received at backbone switch 124 which examines its contents. In particular, backbone switch 124 notes that the message is from server 112a, but that it was received on a different source port than switch 124 previously associated with server 112a. That is, prior to the failure at port number three at access switch 114, backbone switch 124 likely associated all entities directly coupled to switch 114 (including server 112a) with its port coupled to backbone switch 121, which, in turn, accessed such entities via backbone switches 120 and 122.

Since the multicast message 400 having the source address of server 112a was received by backbone switch 124 at a new source port, this new location information is entered by backbone switch 124 into its filtering database, replacing the previous information that was stored therein. Thereafter, if backbone switch 124 receives a message intended for server 112a, it will use this new destination port and the message will be received at port number four of switch 114, which is now capable of receiving and forwarding messages. Accordingly, the dummy multicast message 400 effectively apprises backbone switch 124 of the change in forwarding ports that occurred at access switch 114. Backbone switch 124 distributes the multicast message 400 through all of its forwarding ports so that other devices, as necessary, may learn of the new forwarding port (i.e., port number four) at access switch 114.

Rapid reconfiguration entity 234 similarly generates one or more separate multicast messages 400 for each remaining entity directly coupled to access switch 114 (i.e., entities or end stations on LANs 102–104). In each message 400, entity 234 loads SA field 414 with the address of the corresponding entity. Each of these messages are similarly forwarded by access switch 114 through the new forwarding port (i.e., port number four). In addition, entity 234 generates and transmits one or more multicast messages 400 for entities reachable through switch 114 on ports other than its root port. For example, if port number seven at switch 114 were coupled to another access switch, entity 234 would transmit multicast messages 400 carrying the source address of entities directly coupled to this additional access switch as well. Thus, at least one multicast message 400 is generated and transmitted for each entity directly coupled to or downstream of access switch 114 (relative to the root). As set forth above, upon receipt of these multicast messages 400, the other devices within network 100 update their corresponding filtering databases with the new destination ports, as necessary.

In the preferred embodiment, entity 234 is configured to limit the rate at which dummy multicast messages 400 are transmitted to fifteen messages per one hundred milliseconds or less. This limit on message throughput prevents any access switch from consuming a significant portion of the communications resources of the network 100 with the transmission of dummy multicast messages 400.

Figure 3E:
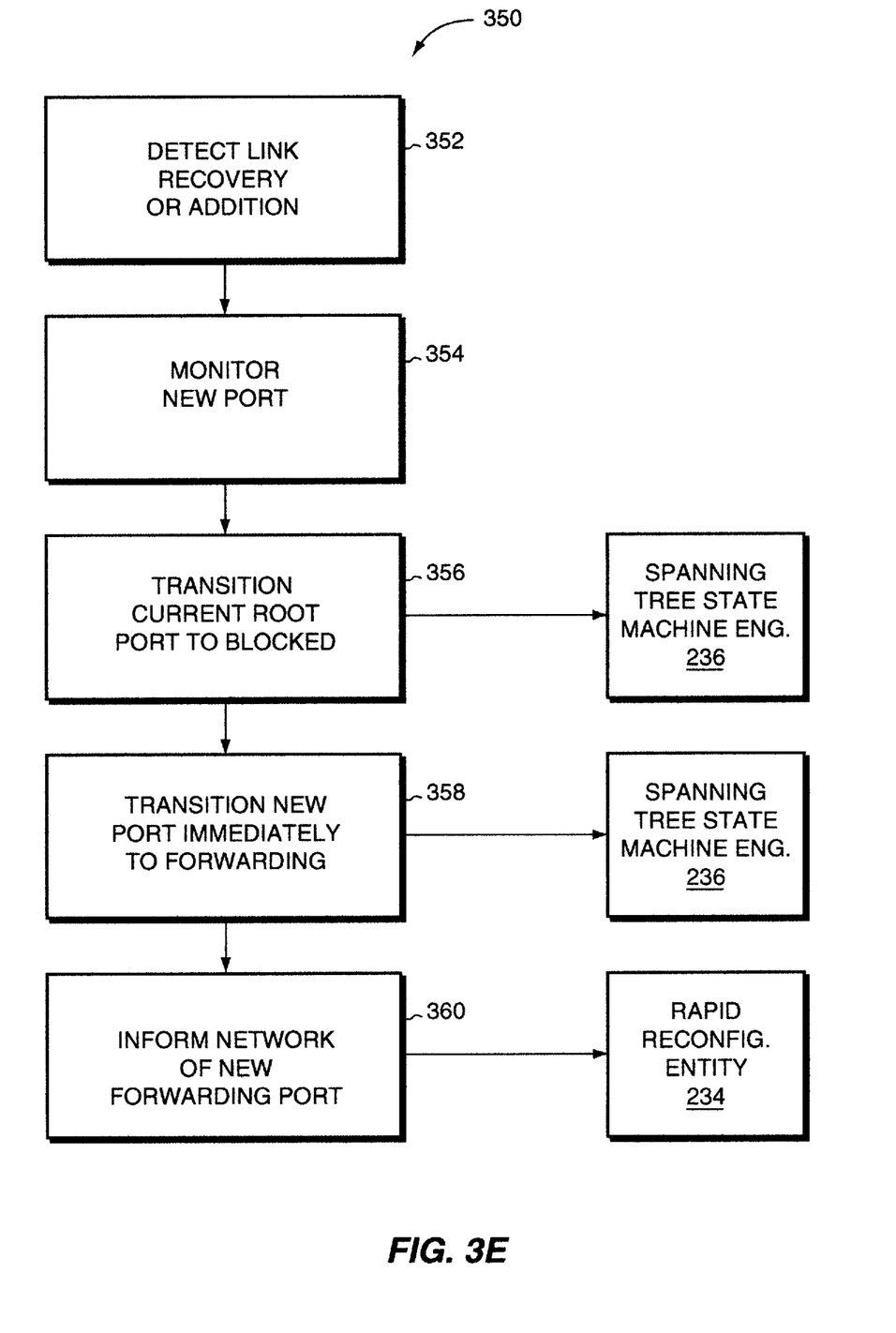

The present invention also provides for rapid reconfiguration when a new link (or switch), representing a better path the root for a given switch, is added or recovered. In particular, FIG. 3E is a flow diagram of a rapid configuration process 350 corresponding to a link recovery or addition in accordance with the present invention. For example, assume that backbone switch 121 (FIG. 1) is the root and that port number three at access switch 114 is the root port, since the link 128 coupled to port number four (which represents a better path cost to root 121) is failed. If the link 128 coupled to port number four is subsequently recovered, switch 114 will detect the change, as indicated at box 352, through the receipt of BPDUs on this port. The recovery of link 128 may also be detected by the link integrity test, as described above.

As shown at block 354, rapid reconfiguration entity 234 monitors the receipt of messages (e.g., BPDUs) at port number four for a period of time (e.g., thirty seconds) to ensure that the corresponding port at the upstream switch (e.g., backbone switch 124) has transitioned to the forwarding state. In particular, since backbone switch 124 still transitions its ports between the listening and learning intermediary states, entity 234 at switch 114 preferably waits a period equal to twice the forwarding delay before starting the transition process. If entity 234 were to immediately transition to a new port, a loss of connectivity might result as the corresponding upstream port may not be forwarding. While port number four is being monitored, moreover, port number three remains in the forwarding state and messages may continue to be forwarded and received during this time. Next, after allowing all messages queued on the current root port (i.e., port number three) to be sent, rapid reconfiguration entity 234 transitions the current root port to the blocked state, as indicated at block 356. At or about the same instant, rapid reconfiguration entity 234, at box 358, directs the spanning tree state machine engine 236 to transition the recovered port (i.e., port number four) directly from the blocked state to the forwarding state without transition through the listening or learning intermediary states. Following this transition, switch 114 may immediately begin transmitting and receiving frames, including data messages, from this recovered port.

Next, rapid configuration entity 234 informs the network 100 (FIG. 1) of the new forwarding port, as reflected by block 360. In particular, as described above, entity 234 generates and transmits dummy multicast messages 400 for all entities directly coupled to switch 114 or downstream thereof (relative to the root) through the new forwarding port (i.e., port number four). The transition to a recovered port, which represents a better path to the root, is thus accomplished without the loss of connectivity that otherwise occurs under operation of the conventional spanning tree algorithm. Additionally, the disadvantages caused by the flooding of messages is also avoided.

Since the Enable_Uplinkfast command 330 is preferably not entered at the backbone switches 120–125, these switches do not designate blocked ports as potential back-up ports that may be immediately transitioned to the forwarding state. Nonetheless, through the Become_Root_Primary and Become_Root_Secondary commands 300, 320, the time required to reconfigure the network following a change at a backbone switch is also reduced. First, as described above, these two commands 300, 320 significantly reduce the maximum age value utilized by all switches in the network 100, thereby reducing the time it takes to detect a change. Additionally, the forward delay time is lowered as reflected in Table 1. By reducing the time spent in the listening and learning states, the speed at which network 100 is reconfigured following a change is substantially improved.

It should be understood that switch 114, in addition to generating and transmitting dummy multicast messages 400 following the detection of a change, may also transmit TCN-PDUs toward the root. As described above, by transmitting TCN-PDUs, switch 114 will cause devices, such as switches 114–116 and 120–125, to shorten the age out time associated with their filtering databases 244. By quickly discarding the contents of their filtering databases 244, the possibility of data messages being misdirected or lost is significantly reduced. Furthermore, the transmission of dummy multicast messages 400, as described above, quickly informs devices of newly activated ports, thereby reducing the flooding that otherwise occurs when the contents of filtering databases 244 are discarded.

The above commands 300, 320, 330 also reduce the disruptions that may occur upon failure of the root. A failure at the root (e.g., backbone switch 120) will suspend the transmission of BPDUs within the network 100. The BPDU information stored at the remaining devices, such as access switches 114–116 and backbone switches 121–123, will then time out, based on the particular maximum age value obtained from Table 1. In response, these devices will begin recalculating the spanning tree for the network 100. Since the Become_Root_Secondary 320 command was entered at backbone switch 121, its corresponding numeric identifier was significantly lowered, causing backbone switch 121 to become the new root. The Become_Root_Secondary command 320 thus ensures that, upon a failure of the primary root (i.e., backbone switch 120), the next switch elected to be the root will also be a backbone switch. By carefully selecting the second backbone switch 121, the average distance traveled by messages within the network 100 may be optimized and partitioning of backbone switches avoided. BPDUs originating from the new root (e.g., backbone switch 121), moreover, will contain the improved parameters set forth in Table 1, by virtue of the Become_Root_Secondary command 320. Thus, switches 114–116 and 120–125 will be able to rapidly reconfigure the network 100 in the face of changes following the election of the new root (e.g., the backbone switch 121).

Virtual Local Area Networks

A computer network, such as network 100 (FIG. 1), may also be segregated into a series of network groups. For example, U.S. Pat. No. 5,394,402, issued on Feb. 28, 1995 to Floyd E. Ross (the "'402 Patent"), which is hereby incorporated by referenced in its entirety, discloses an arrangement that is capable of associating any port of a switch with any particular segregated network group. Specifically, according to the '402 Patent, any number of physical ports of a particular switch may be associated with any number of groups within the switch by using a virtual local area network (VLAN) arrangement that virtually associates the port with a particular VLAN designation. More specifically, Ross discloses a switch or hub for a segmented virtual local area network with shared media access that associates VLAN designations with at least one local port and further associates those VLAN designations with messages transmitted from any of the ports to which the VLAN designation has been assigned.

The VLAN designation for each local port is stored in a memory portion of the switch such that every time a message is received by the switch on a local port the VLAN designation of that port is associated with the message. Association is accomplished by a flow processing element which looks up the VLAN designation in a memory based on the local port where the message originated. In addition to the '402 patent, an IEEE standards committee is preparing a standard for Virtual Bridged Local Area Networks. See IEEE Standard 802.1Q (draft).

In many cases, it may be desirable to interconnect a plurality of these switches in order to extend the VLAN associations of ports in the network. Ross, in fact, states that an objective of his VLAN arrangement is to allow all ports and entities of the network having the same VLAN designation to interchange messages by associating a VLAN designation with each message. Thus, those entities having the same VLAN designation function as if they are all part of the same LAN. Message exchanges between parts of the network having different VLAN designations are specifically prevented in order to preserve the boundaries of each VLAN segment. For convenience, each VLAN designation is often associated with a different color, such as red, blue, green, etc.

A separate spanning tree or active topology may be defined for each VLAN designation defined within the network. See Cisco IOS VLAN Services document. That is, a first spanning tree may be associated with the red VLAN designation and a second spanning tree associated with the blue VLAN designation. Thus, a given port may be in the forwarding state for a first VLAN designation (e.g., red), but blocked for second VLAN designation (e.g., blue).

In a preferred embodiment, the Become_Root_Primary and Become_Root_Secondary commands 300, 320 are associated with one or more VLAN designations. That is, for the red VLAN designation, the Become_Root_Primary command 300 may be entered at backbone switch 120, whereas, for the blue VLAN designation, it may be entered at backbone switch 121. Thus, the root for the spanning tree associated with the red VLAN designation will be at backbone switch 120 and the root for the blue VLAN designation will be at backbone switch 121. By establishing a different root for the various VLAN designations, improved load balancing may be achieved on the network. For example, if the red and blue VLAN designations each generate high message traffic, then, by designating different roots for these VLAN designations, the paths or links followed by messages with the red VLAN designation will be different than the paths or links followed by messages with the blue VLAN designation. Other low-traffic generating VLANs (e.g., yellow and green) may be divided between the two high traffic VLANs. That is, the red and yellow VLAN designations may share backbone switch 120 as their root, while the blue and green VLAN designations may share backbone switch 121 as their root. This provides an even greater measure of load balancing within the network 100.

In particular, the Become_Root_Primary and Become_Root_Secondary commands 330, 320 may include a VLAN list as a second argument in addition to the network diameter. For example, at first backbone switch 120, the Become_Root_Primary command 300 may be entered with a network diameter of four and a VLAN list identifying the red, yellow, orange and violet VLAN designations as its arguments. At second backbone switch 121, the Become_

Root_Primary command 300 may be entered with a network diameter of four and a VLAN list containing the blue, green and magenta VLAN designations as its arguments. In response, switch 120 will become the root for the red, yellow, orange and violet VLAN designations, while switch 121 will become the root for the blue, green and magenta VLAN designations.

Further load balancing may be achieved by having access switches select root ports on a per-VLAN basis. This may be accomplished by modifying the path costs for each trunk port of the access switches on a per-VLAN basis. In particular, the Enable_Uplinkfast command may be modified to adjust the path costs for each trunk port at the respective switch on a per-VLAN basis by adding a port number, VLAN designation and respective path cost string as an argument to the Enable_Uplinkfast command. For example, the Enable_Uplinkfast command 330 may be entered at access switch 114 with the following argument string: port number two, red, 3100; port number two, blue, 3200; port number three, red, 3200; port number three, blue, 3100; port number four, red, 3300; port number four, blue, 3300. Since port number two has the lowest path cost for the red VLAN designation, this port will generally become the root port for the red VLAN. For the blue VLAN designation, port number three has the lowest path cost and thus will become the root port for the blue VLAN. Accordingly, all messages associated with the red VLAN designation will be forwarded and received at port number two and all messages associated with the blue VLAN designation will be forwarded and received at port number three. By dividing the message streams among different trunk ports 119, improved load balancing may be achieved.

Referring again to FIG. 4, in formulating dummy multicast messages following the detection of a change, access switches 114–116 may append a VLAN tag 416 to message 400. The VLAN tag 416 is preferably loaded with the VLAN designation corresponding to the entity whose address is loaded into SA field 412. Although VLAN tag 416 may be appended to the message 400, as shown, it is preferably inserted after the source address field 412. It will be understood by those skilled in the art that tag 416 may be inserted at other locations.

As switches typically support the creation of up to "1024" different VLAN designations, substantial memory may be needed to store a different path cost for each VLAN per port. In the preferred embodiment, path costs are permitted to take only one of two possible values, one of which is a default value. Accordingly, a "128" byte vector can be utilized per trunk port to represent the path costs for each VLAN designation. That is, each bit of the vector represents one VLAN designation. By parsing each bit, rapid reconfiguration entity 234 can determine the path cost for each VLAN designation. More specifically, if the bit is asserted, then the path cost for the corresponding VLAN designation will be set to the new value (e.g., "3100"). If a bit is not asserted, then the path cost for the corresponding VLAN designation will remain at the default value (e.g., "3000").

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. In an intermediate network device having a plurality of ports for forwarding messages between one or more network entities, the device executing a spanning tree algorithm to elect a root and to transition the ports among a plurality of spanning tree port states including blocking, listening, learning and forwarding, and including first and second ports that provide network connectivity to the root, a method for rapidly reconfiguring the ports of the device, the method comprising the steps of:

placing the first port in the forwarding spanning tree port state to allow messages to be forwarded to and from the first port;

placing the second port in the blocking spanning tree port state to prevent messages from being forwarded to or from the second port;

detecting a failure at the first port;

in response to the step of detecting, transitioning the second port from the blocking spanning tree port state directly to the forwarding spanning tree port state without transitioning the second port through either the listening or the learning spanning tree port states, allowing messages to be forwarded to and from the second port.

2. The method of claim 1 further comprising the step, in response to the step of transitioning, of generating and forwarding one or more dummy multicast messages from the second port, each of the one or more dummy multicast messages having a source address of a network entity located downstream of the intermediate network device relative to the root and being free of the source address of the intermediate network device.

3. The method of claim 1 wherein the step of detecting is in response to a failure of a link integrity test operating on the first port.

4. The method of claim 1 wherein configuration bridge protocol data (BPDU) messages are received at the first port and the step of detecting is in response to an interruption in the receipt of BPDU messages at the first port.

5. The method of claim 1 further comprising the step of placing the first port in the blocking spanning tree port state.

6. The method of claim 1 wherein a third port of the intermediate network device is connected to a plurality of network entities that are located downstream from the device relative to the root, the method further comprising the step of forwarding at least one dummy multicast message from the second port for each downstream network entity, each dummy multicast message having a source address corresponding to a respective one of the downstream network entities.

7. The method of claim 6 further comprising the step of placing the first port in the blocking spanning tree port state.

8. The method of claim 1 wherein the intermediate network device includes a bridge identifier and the method further comprises the step of increasing the bridge identifier, whereby the increase in bridge identifier frees the intermediate network device from being elected the root.

9. The method of claim 8 wherein each port of the intermediate network device has an associated port cost and the method further comprises the step of increasing the cost associated with each port, whereby the increase in port costs frees the ports from being elected designated ports when compared with one or more other intermediate network devices whose respective port costs have not been increased.

10. In an intermediate network device having a plurality of ports for forwarding messages between one or more network entities, the device executing a spanning tree algorithm to elect a root, and configurable to include two or more trunk ports for providing network connectivity to the root, a method for rapidly reconfiguring the intermediate network device, the method comprising the steps of:

electing a single one of the two or more trunk ports to be placed in a forwarding spanning tree port state to allow messages to be forwarded to and from the elected trunk port;

placing all other trunk ports providing connectivity to the root in a blocking spanning tree port state to prevent messages from being forwarded to or from these trunk ports;

detecting a failure at the elected trunk port that is in the forwarding spanning tree port state; and in response to the step of detecting, transitioning a selected one of the other trunk ports from the blocking spanning tree port state directly to the forwarding spanning tree port state without transitioning the selected trunk port through either a listening or a learning spanning tree port state, allowing messages to be forwarded to and from the selected trunk port.

11. The method of claim 10 further comprising the step, in response to the step of transitioning, of generating and forwarding one or more dummy multicast messages from the selected trunk port, each of the one or more dummy multicast messages having a source address of a network entity located downstream of the intermediate network device relative to the root.

12. The method of claim 11 further comprising the step of placing the elected trunk port at which the failure was detected in the blocking spanning tree port state.

13. An intermediate network device for forwarding messages among a plurality of network entities of a computer network, the intermediate network device comprising:

a plurality of ports;

a spanning tree state machine engine operatively coupled to the plurality of ports and configured to execute a spanning tree algorithm so as to elect a root and to transition the ports among a plurality of spanning tree port states including blocking, listening, learning and forwarding; and means for detecting a failure at the plurality of ports, wherein the spanning tree state machine is arranged to place a first port that provides connectivity to the root in the forwarding spanning tree port state, and to place all other ports providing connectivity to the root in the blocking spanning tree port state, and further wherein in response to a failure at the first port, the spanning tree state machine engine transitions a selected one of the other ports providing connectivity to the root directly to the forwarding spanning tree state without transitioning the selected port through either the listening or learning spanning tree port states.

14. In an intermediate network device having a plurality of ports for forwarding messages between one or more network entities, the device executing a spanning tree algorithm to elect a root and to transition the ports among a plurality of spanning tree port states including blocking, listening, learning and forwarding in response to processing a plurality of spanning tree parameters, the intermediate network device further including two or more trunk ports that provide network connectivity to the root, a method for rapidly reconfiguring the ports of the device, the method comprising the steps of:

manipulating one or more of the spanning tree parameters at the intermediate network device so that (1) only one of the two or more trunk ports transitions to the forwarding spanning tree port state and (2) all other trunk ports transition to the blocking spanning tree port state;

detecting a failure at the one trunk port that is in the forwarding spanning tree port state; and in response to the step of detecting, transitioning a selected one of the other trunk ports from the blocking spanning tree port state directly to the forwarding spanning tree port state without transitioning the selected trunk port through either a listening or a learning spanning tree port state, allowing messages to be forwarded to and from the selected trunk port.

15. The method of claim 14 wherein the intermediate network device includes a bridge identifier and the step of manipulating includes increasing the bridge identifier to free the intermediate network device from being elected the root.

16. The method of claim 15 wherein each port of the intermediate network device has an associated port cost and the step of manipulating further includes increasing the cost associated with each port to free the ports from being elected designated ports when compared with one or more other intermediate network devices whose respective port costs have not been increased.

* * * * *